(No Model.) 3 Sheets—Sheet 2.
S. T. CARTER & B. H. McCOY.
CORN PLANTER.
No. 368,455. Patented Aug. 16, 1887.
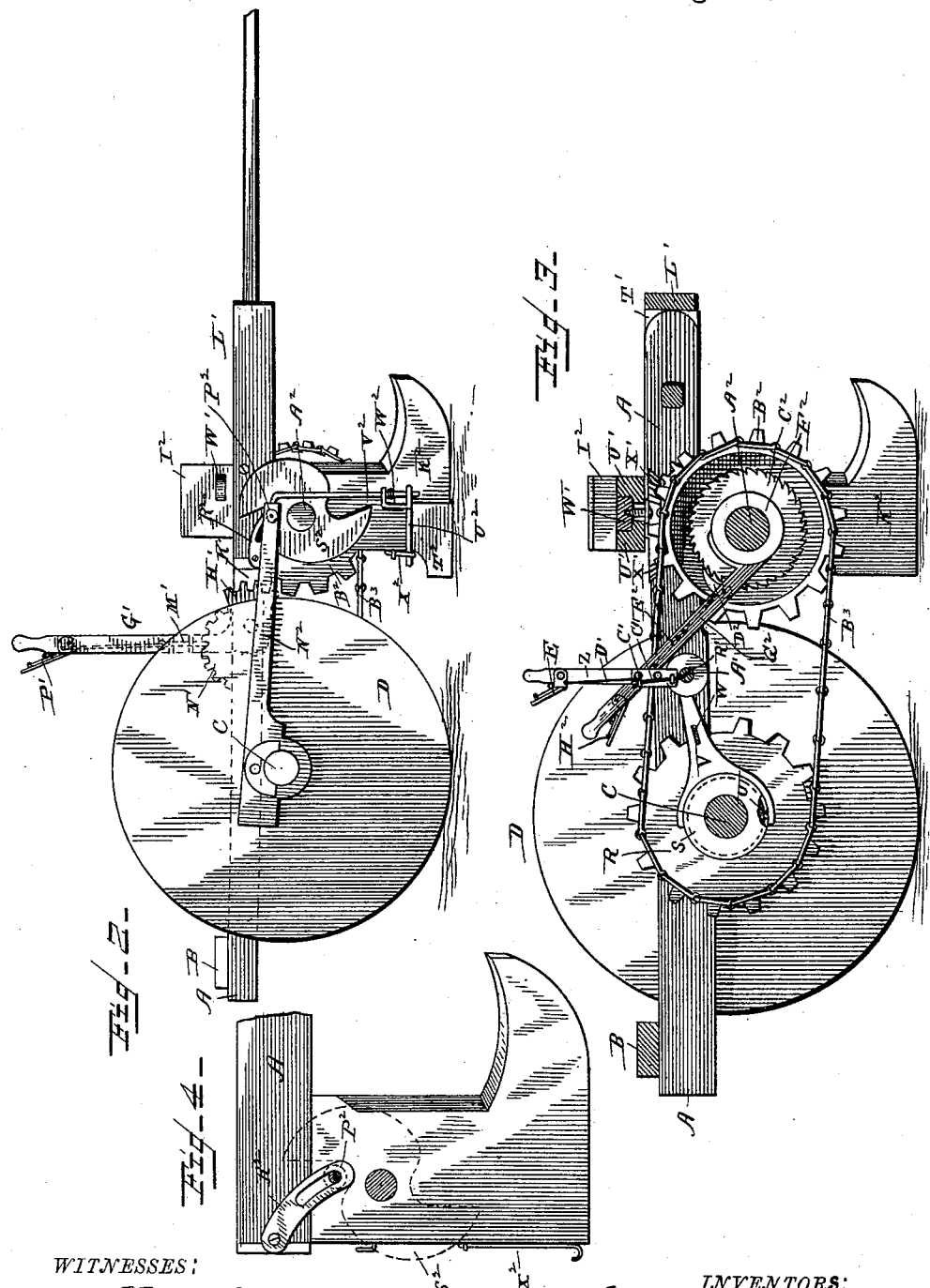
WITNESSES:
INVENTORS:
Attorney

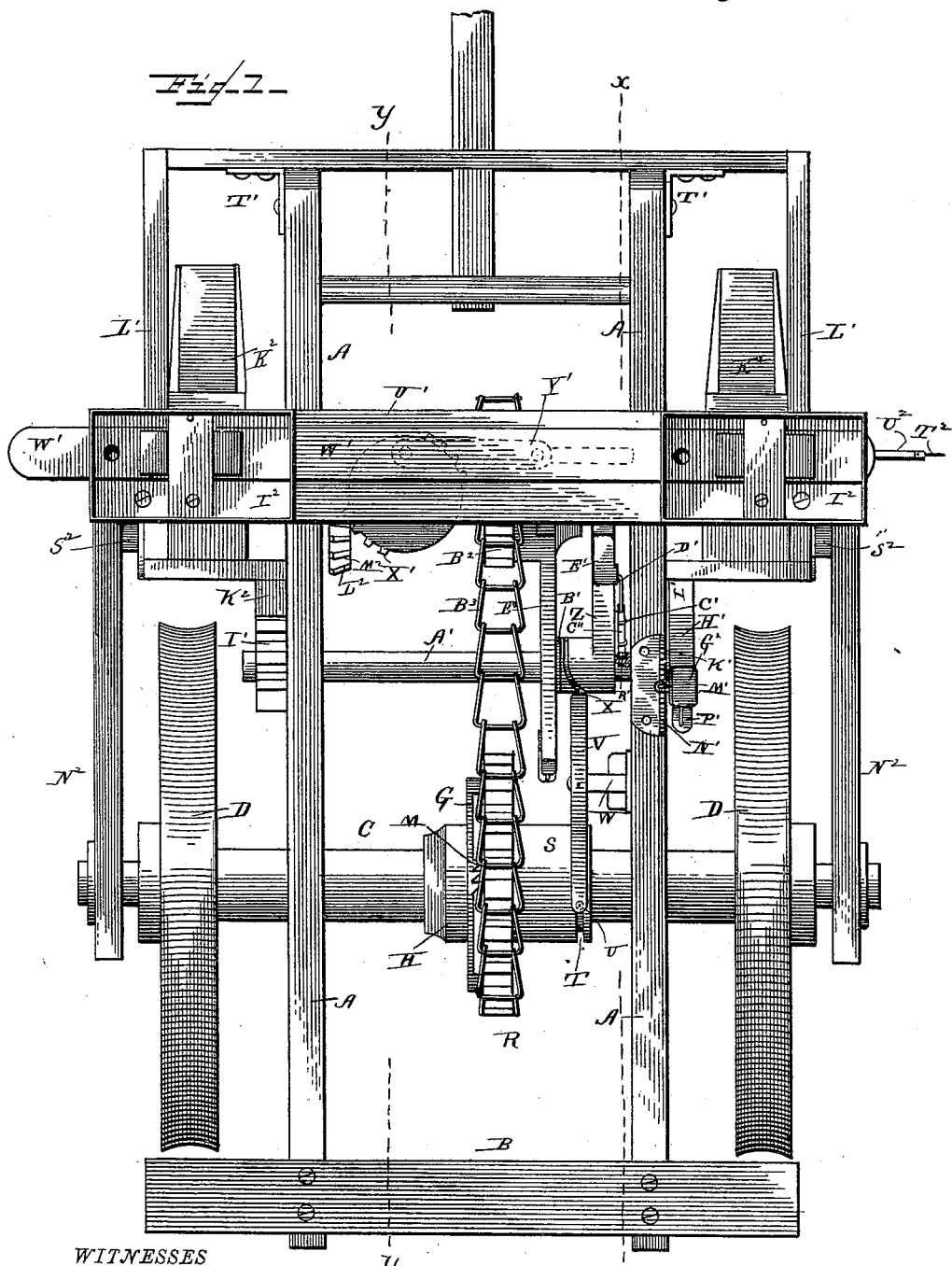

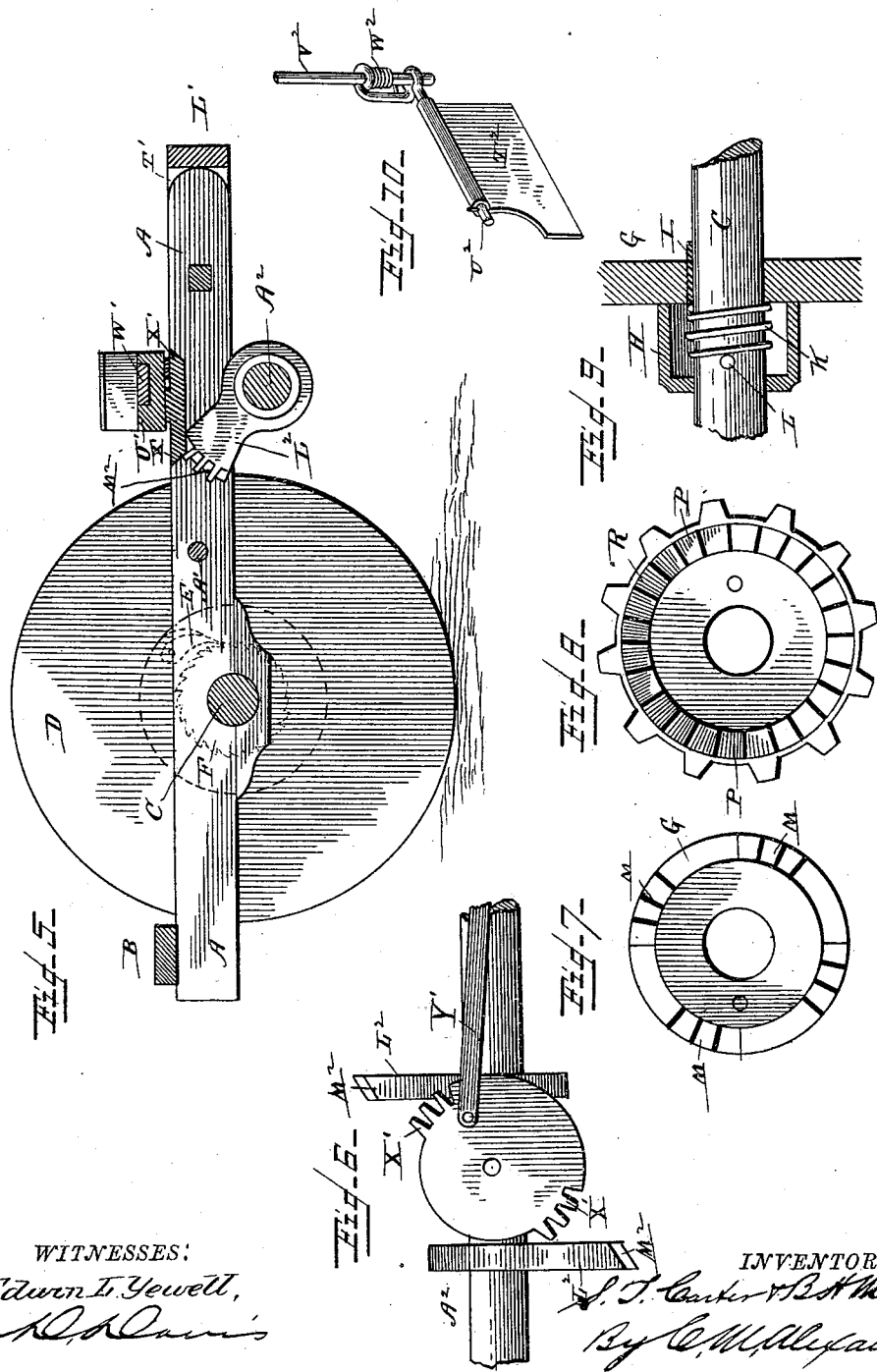

UNITED STATES PATENT OFFICE.

SIDNEY T. CARTER AND BEN H. McCOY, OF SWITTZER, KENTUCKY.

CORN-PLANTER.

SPECIFICATION forming part of Letters Patent No. 368,455, dated August 16, 1887.

Application filed March 31, 1887. Serial No. 233,127. (No model.)

*To all whom it may concern:*

Be it known that we, SIDNEY T. CARTER and BEN H. McCOY, citizens of the United States, residing at Swittzer, in the county of Franklin and State of Kentucky, have invented certain new and useful Improvements in Corn-Planters; and we do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain improvements in seed-planters; and it has for its objects to provide improved mechanism for operating the seed-dropping slides, which will be under convenient control of the driver, to provide for elevating, depressing, and adjusting the frame carrying the seed-planting mechanism, and to provide improved check-row-marking mechanism, which operates automatically in connection with the planter, as more fully hereinafter specified. These objects we attain by the means illustrated in the accompanying drawings, in which—

Figure 1 represents a top view of our improved planter complete; Fig. 2, a side elevation thereof, showing the check-row mechanism; Fig. 3, a longitudinal vertical sectional view taken on the line $x\ x$ of Fig. 1; Fig. 4, a detached elevation of a portion of the forward frame of the machine and a portion of the check-row mechanism in detail; Fig. 5, a longitudinal vertical sectional view of the machine, taken on the line $y\ y$ of Fig. 1; Fig. 6, a detailed view of one portion of the mechanism by which the planting-slides are operated; Fig. 7, a detached view of a clutch-wheel which carries the driving sprocket-wheel of the machine forward; Fig. 8, a similar view showing the face of said sprocket-wheel and the ratchet-teeth with which the clutch engages; Fig. 9, a detailed sectional view of a portion of the driving-shaft and clutch-wheel, showing the means by which said wheel is held normally; and Fig. 10, a detached perspective view of one of the check-row markers.

The letter A indicates the main frame of the planter, which is provided with a cross-brace, B, at the rear, which holds the sides rigidly at the end. The said frame is mounted loosely upon a transverse axle, C, which passes loosely through the driving-wheels D, the hubs of which are recessed and provided each with a pawl, E, which engages a ratchet, F, rigidly secured to the shaft or axle, so as to carry the shaft when the planter moves forward, and allow the wheels to play idly when a backward movement occurs in order to actuate the planting and marking mechanism properly.

To the axle C is secured a clutch-wheel, G, which has a recessed hub, H, setting loosely over the hub and capable of a longitudinal movement thereon. The shaft or axle C is provided with a short longitudinal feather, I, and the hub of the wheel with a groove fitting over said feather, so that while the wheel may move longitudinally on the shaft it will be carried with it as the said shaft rotates. Within the recessed hub is a spiral spring, K, Fig. 9, encircling the shaft, and having a bearing at one end against a pin, L, passing through the shaft, and at the other against the clutch-wheel proper, whereby the said clutch-wheel is pressed toward the driving sprocket-wheel, for the purpose hereinafter described. The face of the clutch-wheel opposite that of the sprocket-wheel is provided with a series of angular projections, M, arranged in an annular line, the office of which is to engage a series of angular ratchets, P, on the face of the sprocket, when the two wheels are thrown together, so as to carry the sprocket-wheel forward when the planter is advanced, and allow it to slip idly upon a backward movement, as more fully hereinafter explained.

The driving sprocket-wheel is indicated by the letter R, and has its hub S mounted loosely on the main shaft or axle C, so as to be capable of a rotary as well as longitudinal movement thereon. The hub S is provided with an annular groove, T, into which project the friction-rollers U on the yoked ends of a lever, V, fulcrumed to a bracket, W, secured to one side of the main frame. The said lever at its forward end is provided with a friction-roller, X, which sets in a cam-groove in the periphery of the hub of a lever, Z, which is mounted loosely upon a shaft, A', journaled in bearings in the sides of the main frame, and is confined against longitudinal movement thereon by a collar, B'. The operating-arm of the said lever is provided with a lock-bar, C″, adapted to slide in ways C′, secured to the same, the upper end of the lock-bar being positively connected by means of a link, D′, with a supplementary spring-actuated lever, E′, fulcrumed to the arm of the lever Z, whereby the lock-bar is held normally down, but permitted to be lifted at the will of the driver, when desired.

To the shaft A′, at one end, is rigidly secured a lever, G′, which has a cogged segment, H′, at its lower end, and to the other end of said shaft is secured a similar cogged segment, I′, the segments intermeshing with the vertical racks K′ K², secured to the movable runner-frame L′, which carries the planting and check-rowing devices. The lever G′ is provided with a sliding lock-bar, M′, working in a segmental rack, N′, secured to the frame of the machine, and the said lock-bar is positively connected with a spring-actuated lever, P′, fulcrumed to the lever G′, by which the said lever may be locked in any desired position.

The shaft A′ is provided with a socket, R′, Fig. 3, with which the lock-bar C″ on the lever Z is adapted to engage, so as to fasten the lever to the shaft when desired, for the purpose hereinafter explained.

The letter L′ indicates a frame, which is hung pivotally by means of brackets T′ to the forward ends of the main frame, so as to swing freely thereon. The said frame is provided with transverse guide bars or ways U′, between which the reciprocating seed-dropping bar W′ slides. To the bottom of the said guideway is journaled a rotating beveled disk having a series of diametrically-opposed cogs, X′. The said wheel is connected with the reciprocating bar by means of a pivoted link, Y′, so that when it is rotated it will move the bar back and forth to drop the seed.

The letter A² indicates a shaft journaled in bearings in the movable frame, and carrying a sprocket-wheel, B², rigidly mounted thereon. The said sprocket-wheel connects by a sprocket-chain, B³, with the sprocket-wheel R, before mentioned, so as to receive motion therefrom. The sprocket-wheel B² on one face is provided with a series of ratchet-teeth, C², which are engaged by a pawl, D², on a lever, E², which is fulcrumed on the shaft A², and has a guide-bearing working upon a guide-collar, F², on the said shaft. The said pawl is connected by a link, G², with a spring-actuated supplementary lever, H², by means of which it may be thrown into and out of engagement with its ratchet for the purpose of adjusting the check-row-marking devices, hereinafter explained.

The letter I² indicates the feed-boxes, which are located above the vertical passages leading to the planting-shoes K². The said seed boxes and shoes are of the ordinary construction, as well as the seed-delivering mechanism of the slides, and therefore need no detailed description.

The shaft A² has rigidly secured to it arms L², having a cogged beveled segment, M², which at intervals engages the cogs on the disk X′, so as to intermittently rotate the same and operate the seed-dropping devices.

The ends of the main shaft project beyond their bearings and carry the arms N², which are loosely attached thereto, so as to swing thereon. These arms extend forward, and at their forward ends are provided with friction-rollers P², the shafts of which are pivoted to the guide-arms R², pivoted to the movable frame.

The letter S² indicates two drop-cams secured to the ends of the shaft A², and so arranged as to raise and drop the arms at intervals, in order to operate the check-row markers.

The letter T² indicates the check-row markers. These consist of two swinging blades, one at each side of the planter, hinged upon the lateral arms U² by the vertical rods V², secured to the arms. The said arms U² are pivoted to the vertical bars, and are held normally outward by means of the springs W², the swinging blades enabling the marker to pass over rough ground, while the pivoted arms permit the same to pass larger obstructions without injury.

The letter X² indicates two hooks secured to the movable frame, and adapted to engage the arms to hold them out of the way while the planter is traveling from place to place.

It will be observed that when the lever Z is operated, its locking-bar being in engagement with the shaft A′, on which it is mounted, the sprocket-wheel will be thrown out of engagement with its clutch-wheel by means of the pivoted yoke-lever and the cam-groove in the lever, and the planting-mechanism frame will be raised from the ground, thereby rendering the planter inactive, ready for transportation from place to place.

Having thus described our invention, what we claim, and desire to secure by Letters Patent, is—

1. In a corn-planter, the combination of the main frame suitably mounted, the clutch-wheel, the sprocket-wheel engaging with the said clutch-wheel, the pivoted yoke-lever V, operating said sprocket-wheel, the seed dropping and carrying frame pivoted to the main frame and provided with toothed racks K′ and K², the transverse shaft A′, carrying an operating-lever and segments which engage with said racks on the pivoted frame, and the lever Z, located upon and engaging with the shaft A′, and provided with a cam-groove which engages the end of the lever V, whereby the planting mechanism may be stopped and the frame carrying the same elevated by a single movement of the lever Z, substantially as described.

2. In a corn-planter, the combination of the main frame suitably mounted and carrying a clutch-wheel and sprocket-wheel engaging with each other, the yoke-lever pivoted to the frame and engaging the said sprocket-wheel, the frame carrying the seed-dropping mechanism and pivoted to the main frame, the shaft A', carrying the lever Z, the same being provided with a cam-groove for operating the yoke-lever, and a locking-bar for engaging the shaft on which the lever is mounted, and means, substantially as described, for operating the seed dropping and carrying frame when the lever Z is operated, all arranged substantially as described.

3. The combination of the main frame suitably mounted and carrying the clutch-wheel and sprocket-wheel, of the seed dropping and carrying frame pivoted to the main frame and provided with rack-bars, the shaft A', carrying segments which engage the said rack-bars, and means, substantially as described, whereby the planting mechanism is stopped and the frame carrying the same elevated simultaneously, substantially as herein specified.

4. The combination of the main frame suitably mounted and carrying a clutch-wheel and a sprocket-wheel, a yoke-lever pivoted to the main frame and engaging with the said sprocket-wheel, the shaft A', carrying toothed segments and an operating-lever, G', the lever Z, located on the shaft and provided with a locking device, and a cam-groove, in which engages one end of the yoke-lever, the planting-frame pivoted to the main frame and carrying toothed rack-bars, which engage with the segments on the shaft A', the shaft A², carrying the sprocket-wheel B² and ratchet-wheel C², the pawl-lever for operating said ratchet and sprocket wheels, the chain connecting the sprocket-wheels, and the marking mechanism, substantially as described.

5. The combination of the main frame suitably mounted, the vibrating arms N², pivoted to the main frame, the planting-frame, also pivoted to the main frame, the shaft A², journaled in the planting-frame and provided at its ends with cams S², mechanism for operating said shaft, the vertical arms V², secured to the said vibrating arms, and the spring-retained horizontal arms pivoted thereto and carrying hinged markers, as and for the purpose herein set forth.

6. The combination, with the vibrating-arms, the vertical arms, and their pivoted side extensions and springs, of the hooks adapted to hold the extensions to the sides of the frame out of the way when desired, substantially as specified.

7. The combination, with the vibrating arms, of the friction-roller shafts and the curved slotted guides pivoted to the sides of the frame in which said shafts work, substantially as and for the purposes specified.

8. The combination, with the vibrating arms, the vertical arms secured thereto, the lateral spring-actuated extensions, and hinged markers, of the friction-rollers, their shafts and pivoted segmentally-slotted guides, and the cams mounted on the forward shaft of the machine, whereby the markers are operated, substantially as specified.

9. The combination, with the forward shaft and the cams for operating the marking devices, of the ratchet secured to the forward sprocket-wheel, and the pawl-lever adapted to operate in connection therewith, whereby the operation of the check-row markers is regulated, substantially as set forth.

In testimony whereof we affix our signatures in presence of two witnesses.

SIDNEY T. CARTER.
B. H. McCOY.

Witnesses:
J. P. THOMPSON,
J. THOMASON.